United States Patent [19]

Saito et al.

[11] Patent Number: 5,369,546
[45] Date of Patent: Nov. 29, 1994

[54] ELECTRIC DOUBLE LAYER CAPACITOR AND METHOD OF MANUFACTURING THE SAME

[75] Inventors: Takashi Saito; Yukari Shimizu; Junji Tabuchi, all of Tokyo, Japan

[73] Assignee: NEC Corporation, Tokyo, Japan

[21] Appl. No.: 22,314

[22] Filed: Feb. 25, 1993

[30] Foreign Application Priority Data

Feb. 26, 1992 [JP] Japan ............................. 4-038922

[51] Int. Cl.[5] .............................................. H01G 9/00
[52] U.S. Cl. ..................................... 361/502; 29/25.03
[58] Field of Search ............... 361/502, 402, 412, 414; 29/25.03, 25.42

[56] References Cited

U.S. PATENT DOCUMENTS

| | | | |
|---|---|---|---|
| 4,616,290 | 10/1986 | Watanabe et al. | 361/502 |
| 4,731,705 | 3/1988 | Velasco et al. | 361/502 |
| 4,868,712 | 9/1989 | Woodman | 361/414 |
| 5,012,385 | 4/1991 | Kurabayashi | 361/502 |
| 5,103,379 | 4/1992 | Kurabayashi et al. | 361/502 |
| 5,172,307 | 12/1992 | Tabuchi et al. | 361/502 |

FOREIGN PATENT DOCUMENTS

| | | | |
|---|---|---|---|
| 0133756 | 11/1978 | Japan | 29/25.03 |
| 2266499 | 10/1990 | Japan | |
| 0006007 | 1/1991 | Japan | 361/502 |
| 3241725 | 10/1991 | Japan | 361/502 |

Primary Examiner—Teresa J. Walberg
Assistant Examiner—Michael D. Switzer
Attorney, Agent, or Firm—Leydig, Voit & Mayer

[57] ABSTRACT

In an electric double layer capacitor, a pair of conductive layers are formed on a pair of electrically insulating substrates, respectively.

A pair of polarizable electrodes are sandwiched between the conductive layers and an ionically conducting separator is interposed between the polarizable electrodes. The polarizable electrodes are preferably made of activated carbon/polyacene composite.

This invention realizes to form a plurality of elements electrically insulated on the same substrate, because it is possible to form the electric double layer capacitors using the electrically insulated substrate. More, it is possible to arrange a plurality of elements in line on the same substrate by designing conductive layers forming on the electrically insulating substrates, so that the electric double layer capacitors of which breakdown voltage is high and the height is low are obtained.

15 Claims, 1 Drawing Sheet

ELECTRIC DOUBLE LAYER CAPACITOR AND METHOD OF MANUFACTURING THE SAME

BACKGROUND OF THE INVENTION

This invention relates to an electric double layer capacitor and manufacturing method thereof, and more preferably to polarizable electrodes of the electric double layer capacitor and manufacturing method thereof.

A cross sectional view of a fundamental element of a conventional electric double layer capacitor (hereinafter referred to as a fundamental cell) is shown in FIG. 1. The construction of the fundamental cell is formed to impregnate electrolytic solution into activated carbon powder as the polarizable electrodes 8, to face a couple of the polarizable electrodes 8 each other through the electron insulating and ionic permeable porous separator 4, and to hold the polarizable electrodes 8 and electrolytic solution with collectors 2a and a gasket 5. In this conventional electric double layer capacitor, the fundamental cells are connected in series corresponding to the required breakdown voltage because the voltage resistance of this fundamental cell is controlled by the electrolysis voltage of electrolytic solution. The conventional electric double layer capacitor is restrictedly used mainly for backup power supply of memories, IC or the like as a counter measure against instantaneous power disconnection, because its equivalent-series resistance is which as more than hundreds m$\Omega$.

However, when it is used for an auxiliary power supply for energy to drive a motor, the equivalent series resistance must be small. Also in case of using for supplying backup power, the one of which whole height is low is required.

A activated carbon/polyacene material and an electric double layer capacitor that uses it as a material, which are shown in Japanese Patent Application No. 2-266498 and Japanese Patent Application No. 2-266499, have a possibility to meet these requirements. In the electric double layer capacitor shown in Japanese Patent Application No. 2-266499, conductive substrates or conductive sheets are used as a substrate material, and forming thick film electrodes made of composite material of activated carbon/polyacene on the substrates, these are used as polarizable electrodes.

In this case, however, conductive substrates or conductive sheets are used as substrate materials, so that in case of connecting fundamental cells in series for rising breakdown voltage the height of the capacitor can not be lower because the fundamental cells are layer built. Also, there is another defect that serially connected fundamental cells can not be made all at once.

Moreover, on the electric double layer capacitor utilizing conductive substrates or conductive sheets are as substrate materials, a plurality of electrically insulated polarizable electrodes of the electric double layer capacitor can not be made on the same substrate. Therefore, the conventional art has a defect that a plurality of electric double layer capacitors arranged as sharing the same substrate can not be made on the same plane.

SUMMARY OF THE INVENTION

The object of this invention is to offer an electric double layer capacitor that the equivalent series resistance is low, the thickness is thin and the manufacturing process is simple and excellent for mass production by using insulating ceramic substrates as substrate materials on which conductive layers are formed.

The electric double layer capacitor of this invention is characterized that composite materials of activated carbon/polyacene are composed on conductive layers formed on electrical insulating ceramic substrates and a couple of these polarizable electrodes are arranged as facing each other through a separator. Also in the above-mentioned electric double layer capacitor, it is characterized that at least two electric double layer capacitors are arranged on a plane by sharing a ceramic substrate and these electric double layer capacitors share a conductive layer as electrically connecting themselves in series.

Formation of conductive layers of this invention is possible by screen printing or sputtering. When the electrolytic solution is aqueous solution, the conductive layers are preferably metals such as Au and Pt or are non-corrosive, conductive materials, such as carbon, TiN, TiC. When the electrolytic solution is organic solvent, metal materials which are protective against electrolyte or conductive can be applied.

Both of alumina or aluminium nitride may be utilized for the electrical insulating ceramic substrate.

Furthermore, it is desirable that activated carbon/polyacene composite include more than 50% of activated carbon.

By using polarizable electrodes of this invention, the height of the electric double layer capacitor can be lower. Also it is possible to manufacture electric double layer capacitors of which ESR is small and the height is low in the same man-hour as to manufacture an electric double layer capacitor by using polarizable electrodes and its manufacturing method even if electrically connecting in series a plurality of electric double layer capacitors.

DESCRIPTION OF THE PREFERRED EMBODIMENT

EMBODIMENT-1

Figure 1:
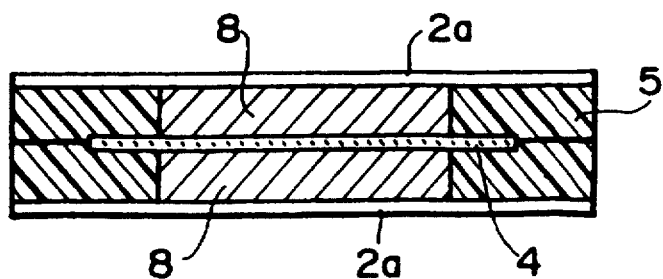
FIG. 1 is a cross-sectional view of a fundamental cell of the electric double layer capacitor.
Figure 2:
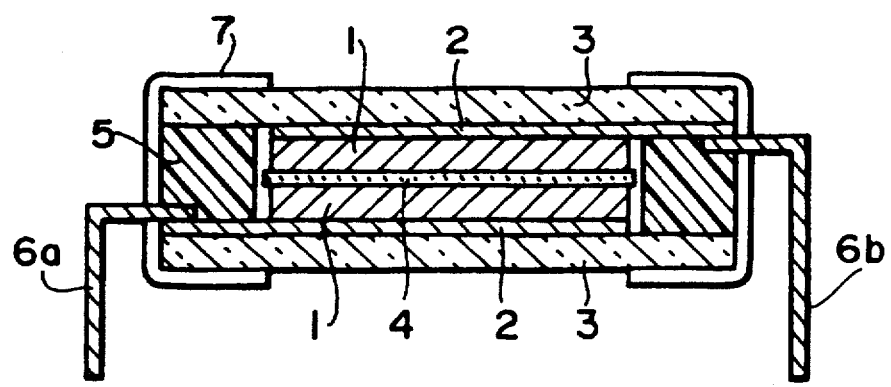
FIG. 2 is a cross-sectional view of the electric double layer capacitor of the first embodiment of this invention.

For an insulating substrate 3 in FIG. 2, an alumina substrate having a volume specific resistance of more than $10^{14}$ $\Omega$ cm, a dimension of $50 \times 50$ mm$^2$ and thickness is 0. 32 mm may be used. Printing gold paste in $40 \times 30$ mm$^2$ on the alumina substrate 3 by using a 325 meshed stainless steel screen and heat treating it in 800° C. air for thirty minutes, the conductive layer 2 is formed. The rate of the rise temperature at this time is 100° C. per one hour.

Next, dissolving phenol resin (Bellpeal made by Kanebo Ltd.) into 2-methoxyethanol, putting activated carbon into this solution in weight ratio 7/3 to phenol resin and mixing with a homogenizer, then the paste is formed. The paste made up of activated carbon and phenol resin is printed in dimension of $30 \times 30$ mm$^2$ on the conductive layer 2 by using 325 meshed stainless steel screen. Holding this for thirty minutes at 150° C. and heat hardening the paste, heat treating it in an electric furnace in nitrogen atmosphere for two hours at 700° C., forming an activated carbon/polyacene electrode on the conductive layer 2, the polarizable electrode 1 of this invention is obtained. The thickness of the activated carbon/polyacene electrode 1 is 30 μm, and it is obtained by observation of the cross section with a scanning electron microscope.

Dipping a couple of polarizable electrodes 1 in sulfuric acid solution of 30 wt %, evacuating the whole of the vessel in which the sulfuric acid solution and the polarizable electrodes 1 are put for one hour, electrolytic solution is impregnated into the activated carbon/polyacene electrodes 1. In the couple of the polarizable electrodes 1 being impregnated with electrolytic solution, wiping off fully sulfuric acid adhered on the part except the activated carbon/polyacene electrodes 1, crimping terminal electrodes 6a, 6b on the conductive layers 2, the crimped part is coated with epoxy resin adhesive for battery sealing.

Adopting electrical insulating butyl rubber for the gasket 5, arranging activated carbon/polyacene electrodes 1 to face each other through an ionically conducting porous separator 4 in thickness of 25 μm made of polypropylene and impregnated with electrolytic solution, fixing and pressing them two ways at pressure of 10 kg/cm² with U-shaped in cross section hardware 7, the electric double layer capacitor of this invention is obtained.

EMBODIMENT-2

Next, as the second embodiment, an electric double layer capacitor is experimentally manufactured similarly to the first embodiment except for forming the conductive layer 2 of carbon film by sputtering.

EMBODIMENT-3

Then, as the third embodiment, an electric double layer capacitor is experimentally manufactured similarly to the first embodiment except for forming the conductive layer 2 of TiN instead of Au.

In the conductive layer 2 of TiN, firstly forming Ti film of 50 nm by DC-sputtering at room temperature on the alumina substrate used in the first embodiment, then TiN film is formed by reactively sputtering. This Ti film is aimed to prevent peeling of TiN film from the alumina substrate 3. The flow rate of the mixed gas in the reactively sputtering is 50% for nitrogen and 50% for argon.

EMBODIMENT-4

Figure 3:
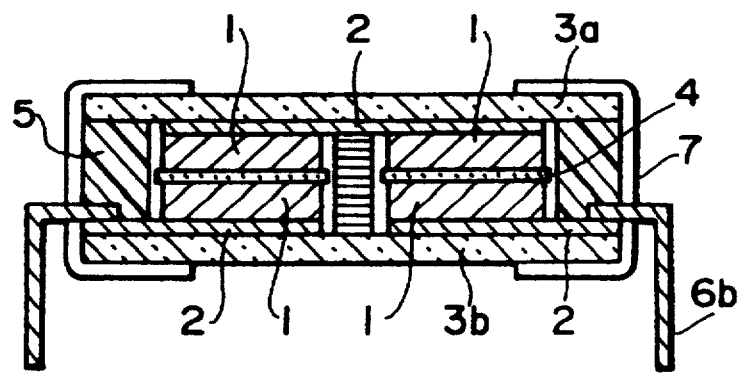
FIG. 3 is a cross-sectional view of the electric double layer capacitor of the embodiment of this invention.

FIG. 3 is a cross-sectional view of the fourth embodiment by this invention. The insulating substrate used in FIG. 3 is similar to the alumina substrate in the first embodiment. Printing an gold paste pattern using 325 meshed stainless steel screen on the alumina substrate 3a in dimension of 30×30 mm² and printing two gold paste patterns with the space of 10 mm using 325 meshed stainless steel screen on the alumina substrate 3b in dimension of 30×20 mm², heat treating them for thirty minutes in air at 800° C., the conductive layer 2 is formed. The rise in temperature of this embodiment is 100° C. per one hour. Next, as with the first embodiment the two paste patterns of activated carbon and phenol resin are printed with 325 meshed stainless steel screen on the conductive layer 2 in dimension of 30×10 mm². As in the first embodiment, except for the shape of the gasket 5, an electric double layer capacitor is obtained. In this embodiment, two elements are formed between two coupled alumina substrates and the elements are connected in line.

In the above embodiments, the structure and manufacturing method has two elements simultaneously formed on the same substrate. It is, however, easy to obtain an electric double layer capacitor connected more than two elements in series by changing a conductive layer formed on a substrate.

COMPARISON

Next, the conventional example is manufactured to be compared with the embodiments of this invention as below. That is, an electric double layer capacitor for comparison is obtained in the same way to the first embodiment except using carbon film of thickness of 0.5 mm for the substrate 3 and electrically insulating the contacting part of the hardware 7 and substrate 3 with vinyl tape.

CHARACTERISTICS

The electric characteristics of the electric double layer capacitors of this invention in capacitance and equivalent series resistance (ESR) are measured. The result is shown in Table 1.

In this measurement, charging rated voltage (90% of the breakdown voltage) on the tested capacitor for one hour, then constantly current discharging at 1 mA, measuring the time that the value of the terminal voltage of the capacitor changes from 60% to 50% of the rated voltage, and the value of capacitance is obtained. Also, the value of equivalent series resistance is obtained to measure impedance at frequency of 1 kHz by a 4 terminal AC method.

It is possible to say that the electric characteristics of the electric double layer capacitor of this invention are the same or better than those of the comparison. In the electric double layer capacitor of the fourth embodiment, two fundamental cells share the same conductive layer 2. However, its ESR is lower than the total resistance of two fundamental cells of the first embodiment. The thickness of the electric double layer capacitor of this invention is 1.8 mm (except the electrode terminals) regardless of its breakdown voltage. Also, if the number of fundamental cells increase because of increment of voltage resistance, the fundamental cell can be arranged on the plane of the substrate. Therefore, the fundamental cell has a constant thickness and low height. A plurality of electric double layer capacitors can be manufactured for forming an SOP typed electric double layer capacitor. This may be accomplished by connecting the electric double layer capacitors in parallel as in the fourth embodiment.

TABLE 1

|  | Capacitance/F | ESR/mΩ | breakdown voltage/V |
|---|---|---|---|
| Embodiment 1 | 2.51 | 25.0 | 1.0 |
| Embodiment 2 | 2.46 | 32.1 | 1.0 |
| Embodiment 3 | 2.54 | 30.5 | 1.0 |
| Embodiment 4 | 0.45 | 35.4 | 2.0 |
| Comparison | 2.45 | 34.2 | 1.0 |

By using the polarizable electrodes of the electric double layer capacitors of this invention, it is possible to simultaneously form electrodes and collectors on the same substrate and to simply manufacture fundamental cells electrically connected series.

What is claimed is:

1. An electric double layer capacitor comprising:
   first and second insulating substrates, each including a first surface, the first surface of the first insulating substrate being disposed facing the first surface of the second insulating substrate;
   first and second conductive layers respectively printed on the first surfaces of the first and second insulating substrates;
   first and second polarizable electrodes respectively baked on and connected to the first and second conductive layers; and
   an ionically permeable separator sandwiched between the first and second conductive layers.

2. The electric double layer capacitor of claim 1 wherein the first and second polarizable electrodes respectively include a plurality of sections forming a plurality of electric double layer capacitor elements between the first and second insulating substrates.

3. The electric double layer capacitor of claim 2 wherein the plurality of electric double layer capacitor elements are connected in series using the first and second conductive layers.

4. The electric double layer capacitor of claim 1 wherein the first and second polarizable electrodes include an activated carbon/polyacene composite material and the first and second insulating substrates are selected from a group of alumina and aluminium nitride.

5. The electric double layer capacitor of claim 4 wherein the first and second conductive layers are selected from a group of Au, Pt, carbon, TiN and TIC.

6. The electric double layer capacitor of claim 4 wherein said activated carbon/polyacene composite includes more than 50% of active carbon using percentage by weight.

7. A method of manufacturing an electric double layer capacitor comprising:
   forming first and second electrically insulating substrates from a material selected from a group of alumina and aluminium nitride;
   printing first and second conductive layers selected from a group of Au, Pt, carbon, TiN and TiC on a first side of the first and second electrically insulating substrates, respectively;
   printing a paste of activated carbon and phenol resin on selected areas of the first and second conductive layers, respectively;
   treating the paste of activated carbon and phenol resin with heat for forming first and second activated carbon/polyacene electrodes on the first and second conductive layers, respectively;
   impregnating electrolytic solution into the first and second activated carbon/polyacene electrodes for forming first and second polarizable electrodes;
   arranging the first and second polarizable electrodes formed on the first side of the first and second electrically insulating substrates to face each other through an ionically conducting separator;
   attaching first and second terminal electrodes to the first and second conductive layers; and
   sealing the first insulating substrate to the second insulating substrate using a gasket;

8. A method of manufacturing an electric double layer capacitor comprising:
   forming first and second electrically insulating substrates from a material selected from a group of alumina and aluminium nitride;
   forming a first conductive layer on a first side of the first electrically insulating substrate by printing material selected from a group of Au, Pt, carbon, TiN, and TiC on the first side of the first electrically insulating substrate;
   forming second and third conductive layers on a first side of the second electrically insulating substrate made of a material by printing material selected from a group of Au, Pt, carbon, TiN, and TiC on the first side of the second electrically insulating substrate;
   forming first and second polarizable electrodes from a material including activated carbon/polyacene on the first conductive layer by selectively printing and heat treating a paste of activated carbon and phenol resin on the first conductive layer;
   forming third and fourth polarizable electrodes from a material including activated carbon/polyacene on a first side of the second and third conductive layers, respectively, by selectively printing and heat treating a paste of activated carbon and phenol resin on the second and third conductive layers;
   impregnating electrolytic solution into the first, second, third, and fourth polarizable electrodes made of activated carbon/polyacene;
   arranging the first and second polarizable electrodes to face the third and fourth polarizable electrodes, respectively;
   disposing a first ionic permeable porous separator between the first and third polarizable electrodes and disposing a second ionic permeable porous separator between the second and fourth polarizable electrodes;
   attaching first and second terminal electrodes to the second and third conductive layers; and
   sealing the first electrically insulating substrate to the second electrically insulating substrate using a gasket.

9. An electric double layer capacitor comprising:
   first and second insulating substrates each including a first surface, the first surface of the first insulating substrate being disposed facing the first surface of the second insulating substrate;
   first and second conductive layers respectively sputtered on the first surfaces of the first and second insulating substrates;
   first and second polarizable electrodes respectively baked on and connected to the first and second conductive layers; and
   an ionically permeable separator sandwiched between the first and second conductive layers.

10. An electric double layer capacitor comprising:
    first and second electrically insulating substrates each having a first surface, the first surface of the first electrically insulating substrate being disposed opposed to the first surface of the second electrically insulating substrate, each electrically insulating substrate including a material selected from a group of alumina and aluminium nitride;
    a plurality of first conductive layers printed on the first surface of the first electrically insulating substrate, each of the first conductive layers including a material selected from a group of Au, Pt, carbon, TiN, and TiC;
    a plurality of second conductive layers printed on the first surface of the second electrically insulating substrate, each of the first conductive layers including a material selected from a group of Au, Pt, carbon, TiN, and TiC;

a plurality of first polarizable electrodes respectively disposed on the plurality of first conductive layers by heat treating an activated carbon/polyacene composite material, wherein the activated carbon/polyacene composite material includes not less than 50% of activated carbon by weight;

a plurality of second polarizable electrodes respectively disposed on the plurality of second conductive layers opposed to the plurality of first polarizable electrodes by heat treating an activated carbon/polyacene composite material, wherein the activated carbon/polyacene composite material includes not less than 50% of activated carbon by weight; and a plurality of ionic permeable porous separators respectively disposed between the plurality of first and second polarizable electrodes, wherein the plurality of first polarizable electrodes, the plurality of ionically permeable porous separators, and the plurality of second polarizable electrodes are respectively connected in series forming a plurality of fundamental cells, the plurality of fundamental cells being connected in series by the plurality of first and second conductive layers.

11. The electric double layer capacitor of claim 1 wherein the first and second conductive layers include a layer of TiN disposed on a layer of Ti to prevent peeling.

12. The electric double layer capacitor of claim 7 wherein forming the first and second conductive layers include forming a layer of TiN over a layer of Ti to prevent peeling.

13. The electric double layer capacitor of claim 8 wherein forming the first, second, and third conductive layers include forming a layer of TiN over a layer of Ti to prevent peeling.

14. The electric double layer capacitor of claim 9 wherein the first and second conductive layers include a layer of TiN disposed on a layer of Ti to prevent peeling.

15. The electric double layer capacitor of claim 10 wherein the plurality of first and second conductive layers include a layer of TiN disposed on a layer of Ti to prevent peeling.

* * * * *

UNITED STATES PATENT AND TRADEMARK OFFICE
CERTIFICATE OF CORRECTION

PATENT NO. : 5,369,546
DATED : November 29, 1994
INVENTOR(S) : Saito et al.

It is certified that error appears in the above-indentified patent and that said Letters Patent is hereby corrected as shown below:

Column5, line 30, change "TIC" to --TiC--,

Column 5, line 61, change ";" to --.--.

Signed and Sealed this

Fourteenth Day of March, 1995

Attest:

BRUCE LEHMAN

*Attesting Officer*  *Commissioner of Patents and Trademarks*